United States Patent
Eadara et al.

(10) Patent No.: US 9,963,588 B2
(45) Date of Patent: May 8, 2018

(54) SPRAYABLE, CARBON FIBER-EPOXY MATERIAL AND PROCESS

(71) Applicant: Diversified Chemical Technologies, Inc., Detroit, MI (US)

(72) Inventors: Rajan Eadara, Ann Arbor, MI (US); Biju Philip, Euless, TX (US); Roy Jacob, Troy, MI (US); Joribeth Joseff, Bloomfield Hills, MI (US); Arnold Joseff, Bloomfield Hills, MI (US)

(73) Assignee: Diversified Chemical Technologies, Inc., Detroit, MI (US)

(*) Notice: Subject to any disclaimer, the term of this patent is extended or adjusted under 35 U.S.C. 154(b) by 155 days.

(21) Appl. No.: 14/700,771

(22) Filed: Apr. 30, 2015

(65) Prior Publication Data

US 2015/0322216 A1 Nov. 12, 2015

Related U.S. Application Data

(60) Provisional application No. 61/991,768, filed on May 12, 2014.

(51) Int. Cl.

| | | |
|---|---|---|
| *C08J 5/04* | (2006.01) | |
| *C08J 3/24* | (2006.01) | |
| *B05D 1/02* | (2006.01) | |
| *B05D 7/14* | (2006.01) | |
| *B05D 7/24* | (2006.01) | |
| *C08G 59/08* | (2006.01) | |
| *C08K 3/04* | (2006.01) | |
| *C08K 7/04* | (2006.01) | |
| *C08K 7/06* | (2006.01) | |
| *C08L 63/00* | (2006.01) | |
| *C08L 63/04* | (2006.01) | |
| *C09D 163/00* | (2006.01) | |
| *C09D 163/02* | (2006.01) | |
| *C09D 163/04* | (2006.01) | |

(52) U.S. Cl.
CPC .............. *C08L 63/00* (2013.01); *B05D 1/02* (2013.01); *B05D 7/146* (2013.01); *B05D 7/148* (2013.01); *C08J 5/042* (2013.01); *C08J 2363/04* (2013.01)

(58) Field of Classification Search
CPC .... C08K 7/02; C08K 7/06; C08K 3/04; C08L 63/00–63/10; C09D 163/00–163/10; C09J 163/00–163/10; B05D 7/14; B05D 7/24; B05D 1/02; C08J 5/042; C08J 2363/00–2363/10
See application file for complete search history.

(56) References Cited

U.S. PATENT DOCUMENTS

| | | | | |
|---|---|---|---|---|
| 5,872,194 | A * | 2/1999 | Isshiki | C08L 63/00 428/447 |
| 7,217,753 | B2 * | 5/2007 | Sinclair | C09D 5/185 524/414 |
| 2001/0039704 | A1 * | 11/2001 | Parker | B21D 39/03 29/33 R |
| 2004/0204551 | A1 * | 10/2004 | Czaplicki | C08G 59/18 525/524 |
| 2005/0111910 | A1 * | 5/2005 | Miller | B21D 39/021 403/278 |
| 2008/0051526 | A1 * | 2/2008 | Yahkind | C09D 171/00 525/518 |
| 2009/0110934 | A1 * | 4/2009 | Cinoman | C08G 59/182 428/418 |
| 2009/0311535 | A1 | 12/2009 | Tilbrook et al. | |
| 2010/0266809 | A1 * | 10/2010 | Schulenburg | B62D 27/026 428/124 |
| 2014/0178672 | A1 * | 6/2014 | McPherson | C09D 7/1291 428/327 |
| 2015/0013902 | A1 * | 1/2015 | Morral | F16B 11/006 156/292 |

FOREIGN PATENT DOCUMENTS

WO WO 2012101042 A1 * 8/2012 ............. C08L 63/00

OTHER PUBLICATIONS

Russ Rowlett, Sheet Metal Thickness Gauges, https://www.unc.edu/~rowlett/units/scales/sheetmetal.html (obtained Dec. 27, 2016).*

* cited by examiner

Primary Examiner — Kregg T Brooks
(74) Attorney, Agent, or Firm — Dinsmore & Shohl LLP

(57) ABSTRACT

An article is reinforced by applying to it a thermally curable composition of a resin mixture of 10% to 60% by weight of a diglycidyl ether of bisphenol-A, 5% to 25% by weight of an epoxy novolac, and 5% to 25% by weight of a reinforcement material comprising carbon fibers. Following application, the composition is cured. In some instances, at least a portion of the diglycidyl ether of bisphenol-A and/or the epoxy phenyl novolac resin may be adducted with an elastomer.

24 Claims, No Drawings

SPRAYABLE, CARBON FIBER-EPOXY MATERIAL AND PROCESS

CROSS-REFERENCE TO RELATED APPLICATIONS

This patent application claims priority of U.S. provisional patent application Ser. No. 61/991,768 filed May 12, 2014, the contents of which are incorporated herein by reference.

FIELD OF THE INVENTION

This invention relates generally to materials and methods for reinforcing articles. In particular aspects it relates to methods and materials for reinforcing metal articles; although, the processes and materials of the present invention may also be used to reinforce polymer based articles. In particular, the invention relates to methods and materials which utilize sprayable curable coatings for reinforcing articles.

BACKGROUND OF THE INVENTION

Motor vehicles, appliances, fuel tanks, fluid delivery systems, and other such articles are frequently manufactured from sheet stock. Manufacturers generally prefer to use relatively thin sheet stock so as to reduce the weight and/or cost of the manufactured articles. However, as the sheet stock is made thinner its strength decreases and this can cause problems with the durability and appearance of the final manufactured item. For example, the automotive industry is seeking to decrease the weight, and hence increase the fuel efficiency, of its motor vehicles by utilizing thinner steel or aluminum stock for their manufacture. However, the use of thinner stock can cause structural defects as well as detract from the appearance of the vehicle.

As will be explained in detail hereinbelow, the present invention provides materials and methods for reinforcing articles such as sheet metal articles by applying a layer of relatively lightweight, high strength reinforcing material thereto. This decreases the overall weight of the article while preserving its strength and appearance.

SUMMARY OF THE INVENTION

Disclosed is a method for reinforcing an article fabricated from a relatively thin body of material, such as an automotive body panel, a tank, a tube, or the like. The method involves applying a composition to at least a portion of a surface of the article, which composition comprises a curable resin mixture having a reinforcement material dispersed therein. In particular, the resin material may comprise a mixture of a diglycidyl ether of bisphenol-A and an epoxy novolac resin, with a carbon fiber reinforcement material dispersed therein. The composition is cured to produce a high strength coating which reinforces the article. Curing may be thermal, and the thermal curing process may be integrated with painting or other manufacturing steps.

In some specific instances, the composition includes, by weight, 10% to 60% by weight of the diglycidyl ether of bisphenol-A, 5% to 25% of the epoxy novolac, and 5% to 25% of the carbon fiber reinforcement material. The curable composition of the present invention may have, in its uncured state, a viscosity in the range of 50,000 to 600,000 cPs. Thickness of the applied layer may range from 0.1 to 3.0 mm, and this thickness may be uniform or it may vary across portions of the article. Application of the coating may be accomplished by spraying, extrusion coating, dip coating, shoveling, or the like.

It is notable that the coatings of the present invention will not wash off, or otherwise contaminate processing baths such as phosphating baths or electro coating baths of the types normally used in processes for fabricating motor vehicles or other articles. It also significant that the coatings of the present invention are weldable.

Also disclosed are specific compositions of the present invention.

DETAILED DESCRIPTION OF THE INVENTION

This invention may be implemented in a number of embodiments, and with regard to the reinforcement of a number of various articles including, but not limited to, motor vehicle body components, appliances, furniture, tanks, pipes and other planar and tubular articles fabricated from metal and/or polymeric stock. In the basic implementation of the invention, an article is reinforced by coating at least a portion of one of its surfaces with a composition of a curable polymer having a reinforcing material dispersed therein. In particular embodiments, the coating may be carried out by spraying a composition onto the article. In other instances, coating may be carried out by extruding a body of material onto the article, by painting a layer of the material onto the article, or by any other process known and apparent to those of skill in the art.

The composition of the present invention may comprise a thermally curable resin, such as a heat curable epoxy resin, or a mixture of such resins, and the reinforcing material may comprise a fibrous material such as a glass fiber or carbon fiber. In other instances, the reinforcing material may comprise naturally grown fibers, mineral fibers, ceramic fibers, and polymeric fibers, as for example polyimide or polyamide fibers.

In some instances, the reinforcing coating is applied to the entirety of the inward and/or outward surface of an article. For example, the coating may be applied to the entirety of an inward facing surface of an automotive vehicle panel. It has been found that doing so prevents "read through" on the front, visible surface of the panel, wherein the outline of a body of resin on a portion of an inside surface of a panel produces a corresponding outline on the panel's outer surface. In other instances, where this is not a concern, only a portion of the article may be coated. In some instances, the coating is applied at a uniform thickness to the article whereas in other instances, particularly when surfaces of an article are curved, coating thicknesses may vary as a function of the surface curvature of the article and/or strength requirements. In such instances it has been found that the varying stiffness of the different thicknesses can contribute to the dimensional stability of the shaped article.

It has been found that the use of thermally curable compositions are of particular advantage in some manufacturing processes, since the curing step can then be coordinated with subsequent heating steps such as steps utilized to cure paint coatings. In such instances, it may be advantageous to apply the composition to the article and then precure, or partially cure, that composition so as to increase its viscosity and prevent running or sticking of the coated article. Following the precure, the article can then be conveyed to further processing steps such as assembly steps and paint curing steps.

In one particular embodiment, the present invention utilizes a thermally curable, epoxy resin based, carbon fiber containing, composition for the reinforcement of sheet metal articles such as automotive body panels, construction panels, furniture, appliances, pipes or other tubular members, fuel tanks, and other vessels. In one typical group of compositions, the resin component comprises approximately 50% by weight of the composition, and the carbon fiber reinforcement material comprises approximately 15-20% by weight of the composition.

The composition may further include curing agents and fillers such as carbon black, wollastonite, fumed silica, ground rubber, and the like. Generally, compositions of this type will also include a coupling or binding agent such as a silane based material which aids in bonding the resin component to the other solids in the composition such as the carbon fiber and fillers. The coupling or binding agent can also aid in bonding the material to the article being reinforced. Other resins, such as urethanes, may also be included in the composition where they function to modify the hardness, elasticity, adhesion, or other physical properties of the cured composition.

One group of exemplary compositions of the present invention utilize a mixture of epoxy resins including diglycidyl ethers of bisphenol-A and epoxy phenol novolac resins. Compositions of this type may further include non-epoxy resins such as urethanes. Compositions will further include curing agents, fillers, and coupling agents, as well as reinforcing fibers such as carbon fibers. Table 1 below lists the components, by trade name as well as generic chemical name, of a group of exemplary compositions of the present invention. In this regard, Table 1 provides actual weight percentage for a specific composition, as well as weight ranges for the various components as may be present in other compositions of this general type.

TABLE 1

| | Chemical Name | Wt % Range |
|---|---|---|
| 1 | Core Shell Rubber in liquid Bisphenol-A epoxy resin | 5.0-15.0 |
| 2 | Diglycidyl Ether of Bisphenol-A | 10.0-40.0 |
| 3 | Epoxy Phenol Novolac Resin with Carboxyl-terminated butadieneacrylonitrile elastomer | 2.0-10.0 |
| 4 | Diglycidyl Ether of Bisphenol-A with Carboxyl-terminated butadieneacrylonitrile elastomer | 5.0-15.0 |
| 5 | Reactive urethane based toughener | 4.0-20.0 |
| 6 | Epoxy Phenol Novolac Resin | 4.0-10.0 |
| 7 | Diglycidyl Ether Cycloaliphatic Difunctional Epoxy | 5.0-10.0 |
| 8 | Organosilane-epoxy functional | 0.5-2.0 |
| 9 | Carbon Fiber | 5.0-25.0 |
| 10 | Carbon Black | 0.05-1.0 |
| 11 | Wollastonite | 5.0-30.0 |
| 12 | Micronized Dicyandiamide | 3.0-8.0 |
| 13 | Fumed Silica | 3.0-6.0 |

In the compositions of Table 1, components 2 and 4 comprise diglycidyl ethers of bisphenol-A; and in this regard in the resin of component 4 is a modified by adducting the diglycidyl ether of bisphenol A with a carboxyl-terminated butadiene acrylonitrile elastomer. Components 3 and 6 comprise epoxy phenol novolac resins; and similarly, in component 6, the epoxy phenyl novolac is adducted with a carboxyl-terminated butadiene acrylonitrile elastomer. Component 7 is another diglycidyl ether epoxy resin, and these components form the base curable resin portion of the composition.

The particular compositions of Table 1 include other curable resin components identified as components 1 and 5. Component 1 is a product comprising rubber particles disposed in a curable bisphenol-A epoxy resin. Component 5 is a curable urethane resin used to provide toughness to the finished coating.

The compositions of the present invention include a reinforcement material therein, and in the materials of Table 1, reinforcing material is primarily carbon fiber identified as component 9. Other reinforcement material such as glass fiber, organic fibers, and the like may also be employed in similar compositions. Generally, coupling agents will be included in the composition to enable the resin component to adhere to the reinforcing material as well as to the substrates upon which it is being employed. In the compositions of Table 1, the coupling agent comprises an organosilane-epoxy material identified as component 8.

The compositions will also include curing agents which promote hardening of the resin component. In the compositions of Table 1, the curing agents comprise item 12, namely micronized dicyandiamide. Other curing agents are known and available to those of skill in the art and may be likewise used. The particular type and amount of curing agents employed will depend to some degree upon the nature of the particular resins being utilized in specific compositions and may be readily selected by those of skill in the art. The compositions of Table 1 may also include fillers, and as specifically shown therein, these fillers may comprise carbon black identified as component 10 as well as mineral fillers such as wollastonite as shown at component 11, fumed silica identified as component 13, as well as the previously mentioned rubber material of component 1.

The blending of the components of the compositions of the present invention will depend upon particular materials which are being employed. In accord with one method of preparing the compositions of Table 1, components 1-8 are sequentially added into a mixing system having a chiller for temperature control. The components are mixed for approximately 20 minutes under varying low and high shear conditions. Following that, components 9-11 are added to the mixture and again blended under alternating low and high shear conditions while maintaining material temperature below 90° F. Following the second step, items 12-13 are added to the mixer in sequence, and mixing is carried out for 10 minutes until all the powder components are wetted. Thereafter, vacuum is applied to the mixer and mixing is continued for 15 minutes under low shear conditions to produce the final product. Compositions of the type described above have a density which is generally in the range of 10-12 pounds per gallon. The viscosity of these compositions generally ranges from 50,000 to 600,000 cPs, and the compositions have a gray-black color.

A material corresponding to the specific composition of Table 1 was applied, in varying thicknesses, to a series of identical steel panels having a thickness of 0.60 mm and the flexural strength of the coated samples was measured both in compression and tension by a three point method wherein a coated panel is supported at a first surface at two spaced apart points, and force applied thereto from the opposite surface at a point between the two points of support. In the compression mode, the force is applied from the side having the coating material thereupon and in the tension mode, the force is applied from the uncoated side of the steel substrate.

Similarly flexural strength was measured in tension for steel thicknesses of 0.65 mm, 0.7 mm, 0.8 mm and 0.9 mm. Results of the tests are summarized in Table 2 below.

TABLE 2

| Sample | Steel Thickness (mm) | Material Thickness (mm) | Test Type | Strength (N) |
| --- | --- | --- | --- | --- |
| 1 | 0.60 | 1.02 | Compression | 100.30 |
| 2 | 0.60 | 1.02 | Tension | 77.20 |
| 3 | 0.60 | 0.73 | Compression | 71.90 |
| 4 | 0.60 | 0.82 | Tension | 74.90 |
| 5 | 0.60 | 0.65 | Compression | 64.06 |
| 6 | 0.60 | 0.60 | Tension | 44.58 |
| 7 | 0.65 | 1.00 | Tension | 80.50 |
| 8 | 0.65 | 2.00 | Tension | 130.00 |
| 9 | 0.70 | 1.00 | Tension | 83.45 |
| 10 | 0.70 | 2.00 | Tension | 140.00 |
| 11 | 0.80 | 1.00 | Tension | 90.00 |
| 12 | 0.80 | 2.00 | Tension | 145.00 |
| 13 | 0.90 | 1.00 | Tension | 100.00 |
| 14 | 0.90 | 2.00 | Tension | 155.00 |

As will be seen, the material of the present invention greatly increases the flexural strength of steel substrates to which it has been applied. Similar results were found utilizing aluminum substrates shown in table 3.

TABLE 3

| Applied Material | Flexural Strength on 0.8 mm Aluminum Alloy (N) | |
| --- | --- | --- |
| Thickness (mm) | Alcoa 6022 | Alcoa 5182 |
| 0 | 30.0 | 30.0 |
| 0.5 | 50.0 | 52.0 |
| 1.0 | 60.0 | 64.0 |
| 1.5 | 80.0 | 85.0 |
| 2.0 | 110.0 | 114.0 |

Fracture toughness of the coatings of the present invention typically range from 0.5-0.6 KJ/m$^2$. The peel strength of the compositions of the present invention, as measured by the force required to pull apart two substrate members bonded by the coating material, is approximately 16 MPa for both steel and aluminum substrates.

The compositions of the present invention greatly enhance the structural integrity of substrates to which they are applied. In addition, the uncured coating material is storage stable for relatively long periods of time and may be readily applied to substrates without requiring significant surface preparation. The cured coatings are dimensionally stable over a wide temperature range. They are corrosion resistant and resistant to degradation by saltwater and atmospheric pollutants.

In the practice of the present invention, the reinforcing composition may be applied to articles either robotically or manually; and application may be accomplished by processes which include, but are not limited to, spraying, extrusion coating, dip coating, shoveling, or the like. The composition may be applied to the entirety of an article or to only portions of a surface. While the foregoing description has primarily been concerned with applying the composition to metallic articles, it is to be understood that the present invention will also have significant utility in connection with the reinforcement of polymer based articles, including composite articles such as fiber reinforced composites of the type utilized in the aerospace industry. While the foregoing description has primarily discussed thermally curing the compositions, it is to be understood that the present invention may be practiced in connection with chemically cured or photochemically cured materials.

The foregoing discussion, description, and appendices describe particular aspects and embodiments of the present invention but are not meant to be limitations upon the practice thereof. Other embodiments of the present invention will be apparent to those of skill in the art in view of the teaching presented herein. It is the following claims, including all equivalents, which define the scope of the invention.

The invention claimed is:

1. A method for surface coating an article comprising:
   applying to the article a composition comprising a curable resin mixture of:
      10% to 60% by weight of a diglycidyl ether of bisphenol A, wherein at least a portion of said diglycidyl ether of bisphenol A comprises a diglycidyl ether of bisphenol A with an elastomer adducted thereto;
      5% to 25% by weight of an epoxy novolac, and
      5% to 25% by weight of a reinforcement material comprising carbon fibers; and
   curing said composition, wherein said article comprises a sheet of steel having a thickness of no more than 0.9 millimeters and said cured composition increases a flexural strength of said sheet of steel.

2. The method of claim 1, wherein the step of applying said composition to said article comprises spraying said composition to only a portion of said article so that at least one surface of said article is free of said composition.

3. The method of claim 1, wherein said composition is applied to said article in a thickness in the range of 0.1-3.0 mm.

4. The method of claim 1, wherein the thickness of said composition applied to said article is uniform.

5. The method of claim 1, wherein the thickness of said composition applied to said article varies.

6. The method of claim 1, wherein said article is selected from the group consisting of: tubular members, tanks, flat panels, curved panels, and combinations thereof.

7. The method of claim 1, wherein said reinforcement material comprises carbon fibers having a length in the range of 50-150 microns.

8. The method of claim 1, wherein said composition further includes one or more of: a curing agent, rubber, carbon black, a urethane, a coupling agent, and a mineral filler.

9. The method of claim 1, wherein said elastomer comprises a carboxyl terminated butadieneacrylonitrile elastomer.

10. The method of claim 1, wherein at least a portion of said epoxy novolac resin comprises an epoxy phenol novolac resin with an elastomer adducted thereto.

11. The method of claim 10, wherein said elastomer comprises between 2.0% to 10.0% by weight of a carboxyl-terminated butadieneacrylonitrile elastomer.

12. The method of claim 1, wherein said article is at least partially coated with a primer composition prior to the application of said material thereto.

13. An article made by the process of claim 1.

14. A method for surface coating an article comprising:
   spraying to the article with a composition comprising a curable resin mixture of:
      10% to 60% by weight of a diglycidyl ether of bisphenol A,
      5% to 25% by weight of an epoxy novolac, wherein at least a portion of said epoxy novolac resin comprises an epoxy phenol novolac resin with an elastomer adducted thereto, and 5% to 25% by weight of a reinforcement material comprising carbon fibers; and curing said composition, wherein said article comprises a sheet of steel having a thickness of no more than 0.9 millimeters and said cured composition increases a flexural strength of said sheet of steel.

15. The method of claim 14, wherein the step of applying said composition to said article comprises spraying said composition to all of the surface area or only a portion of said article.

16. The method of claim 14, wherein said composition is applied to said article in a thickness in the range of 0.1-3.0 mm.

17. The method of claim 14, wherein the thickness of said composition applied to said article is uniform.

18. The method of claim 14, wherein the thickness of said composition applied to said article varies.

19. The method of claim 14, wherein said article is selected from the group consisting of: tubular members, tanks, flat panels, curved panels, and combinations thereof.

20. The method of claim 14, wherein said reinforcement material comprises carbon fibers having a length in the range of 50-150 microns.

21. The method of claim 14, wherein said composition further includes one or more of: a curing agent, rubber, carbon black, a urethane, a coupling agent, and a mineral filler.

22. The method of claim 14, wherein said elastomer comprises between 2.0% to 10.0% by weight of a carboxyl-terminated butadieneacrylonitrile elastomer.

23. The method of claim 14, wherein said article is at least partially coated with a primer composition prior to the application of said material thereto.

24. An article made by the process of claim 14.

* * * * *